(12) United States Patent
Jones

(10) Patent No.: US 10,755,306 B2
(45) Date of Patent: Aug. 25, 2020

(54) ENHANCED ADVERTISEMENT BLOCKING

(71) Applicant: PAYPAL, INC., San Jose, CA (US)

(72) Inventor: Ashley Jones, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 307 days.

(21) Appl. No.: 15/335,980

(22) Filed: Oct. 27, 2016

(65) Prior Publication Data

US 2018/0121954 A1 May 3, 2018

(51) Int. Cl.
*G06Q 30/02* (2012.01)
*G06Q 40/02* (2012.01)

(52) U.S. Cl.
CPC ......... *G06Q 30/0255* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 2008/0290987 A1* | 11/2008 | Li | G06Q 30/02 340/5.1 |
| 2009/0024462 A1* | 1/2009 | Lin | G06Q 30/02 705/14.67 |
| 2014/0156392 A1* | 6/2014 | Ouimet | G06Q 30/02 705/14.49 |
| 2014/0249916 A1* | 9/2014 | Verhaeghe | G06Q 40/12 705/14.51 |
| 2014/0278992 A1* | 9/2014 | Roundtree | G06Q 30/0257 705/14.55 |
| 2016/0239880 A1* | 8/2016 | Blanchfield | G06Q 30/0277 |
| 2016/0253702 A1* | 9/2016 | Gonzales, Jr. | G06Q 30/0249 705/14.48 |
| 2018/0039702 A1* | 2/2018 | Bailey | G06N 20/00 |

OTHER PUBLICATIONS

"Behavioral Ads Appearing on Online Banking Statements" (published online at https://www.csoonline.com/article/2228514/behavioral-ads-appearing-on-online-banking-statements.html on Feb. 14, 2011) (Year: 2011).*

* cited by examiner

*Primary Examiner* — James M Detweiler
(74) *Attorney, Agent, or Firm* — Haynes and Boone, LLP

(57) ABSTRACT

A computer system determines a financial health rating for a user based on financial information associated with the user. The computer system detects receipt of digital content that includes an advertisement. Responsive to the detecting receipt of digital content, the computer system compares the content of the advertisement to the determined financial health rating of the user to determine whether the advertisement is appropriate for the user. Responsive to determining that the advertisement is not appropriate for the user, the computer system disallows display of the digital content.

20 Claims, 5 Drawing Sheets

ENHANCED ADVERTISEMENT BLOCKING

TECHNICAL FIELD

The present disclosure relates generally to advertisement (ad) blocking, and more particularly to ad block based on certain factors.

BACKGROUND

Advertisement (Ad) blocking or ad filtering refers to the process of removing or altering advertising content, in most cases, from a webpage. Advertising can exist in a variety of forms including pictures, animations, embedded audio and video, text, and pop-up windows. Typically, web browsers offer an ad blocking solution which may target certain file formats that are used to deliver the ads or target uniform resource locators (URLs) that are the source of the ads. To users, the benefit of ad blocking includes quicker loading and a cleaner looking web page free from advertisements. Furthermore, blocking an ad can lead to lower resource waste (bandwidth, CPU, memory, etc.), and privacy benefits through the exclusion of tracking and profiling activities conducted by ad delivery platforms.

Figure 1:
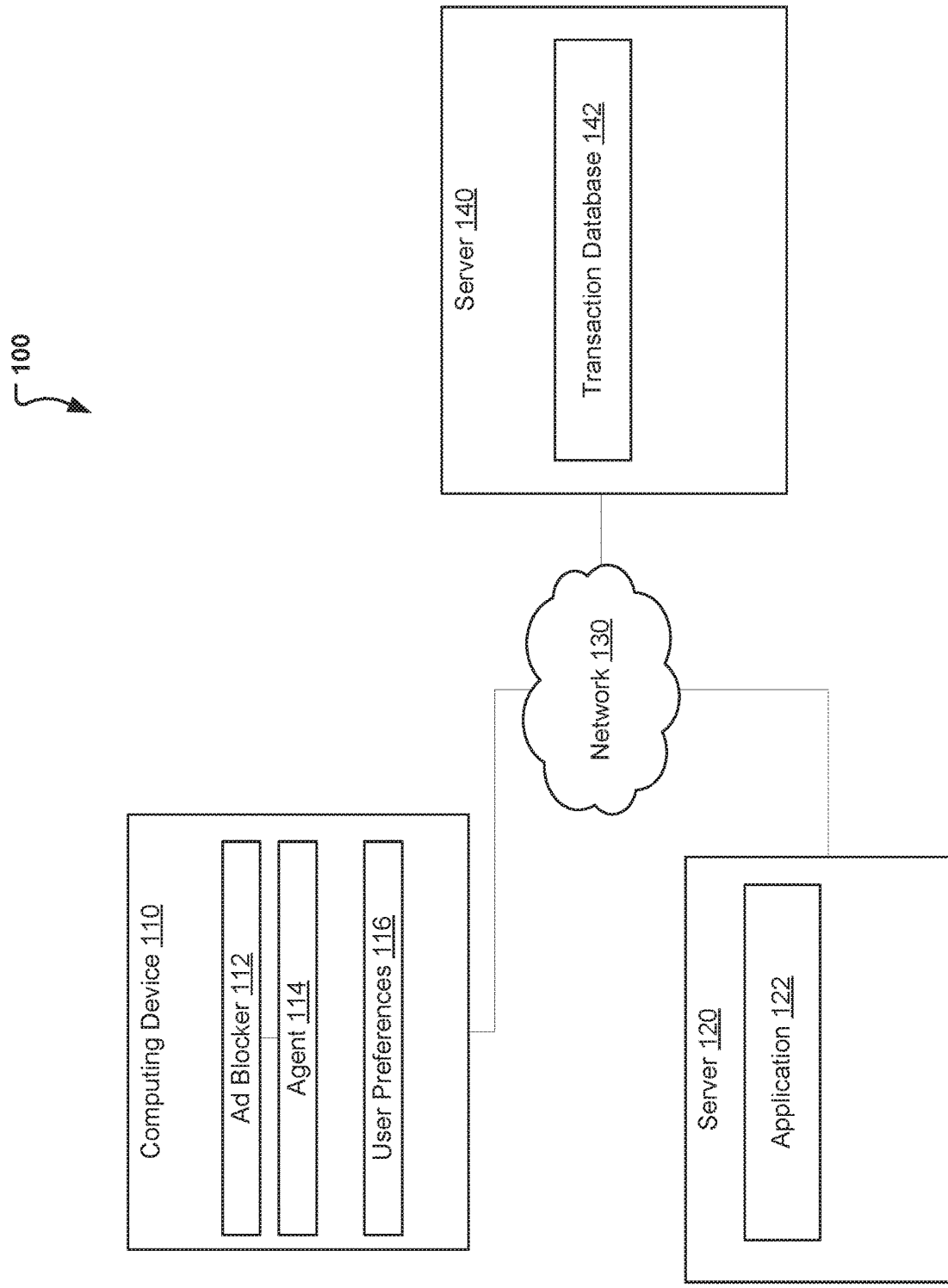
FIG. 1 illustrates an ad blocking system, in accordance with an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure provide a system, method, and program product for determining whether digital content is appropriate for a user, in accordance with an embodiment. A computer system may determine a financial health rating for a user based on financial information associated with the user. The computer system may detect receipt of digital content that includes an advertisement. Responsive to the detecting receipt of digital content, the computer system may compare the content of the advertisement to the determined financial health rating of the user to determine whether the advertisement is appropriate for the user. Responsive to determining that the advertisement is not appropriate for the user, the computer system may disallow display of the digital content.

Embodiments of the present disclosure will now be described in detail with reference to the accompanying Figures.

FIG. 1 illustrates ad blocking system 100, in accordance with an embodiment. In an example embodiment, ad blocking system 100 includes computing device 110, server 120, and server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110, server 120, and server 140.

Server 120 includes application 122. Server 120 may be a desktop computer, a laptop computer, a tablet computer, a handheld device, a smart-phone, a thin client, or any other electronic device or computing system capable of receiving and sending data to and from other computing devices, such as computing device 110, via network 130. Although not shown, optionally, server 120 can comprise a cluster of servers executing the same software to collectively process requests as distributed by a front end server and a load balancer. Server 120 is described in more detail with reference to FIG. 5.

Application 122 is a collection of files including, for example, hypertext markup language (HTML) files, Cascading Style Sheets (CSS) files, image files and JavaScript files. Application 122 may also include other resources such as audio files and video files. In one embodiment, application 122 may be a website.

Server 140 includes transaction database 142. Server 140 may be a desktop computer, a laptop computer, a tablet computer, a handheld device, a smart-phone, a thin client, or any other electronic device or computing system capable of receiving and sending data to and from other computing devices, such as computing device 110, via network 130. Although not shown, optionally, server 140 can comprise a cluster of servers executing the same software to collectively process requests as distributed by a front end server and a load balancer. Server 140 is described in more detail with reference to FIG. 5.

In the example embodiment, transaction database 142 is a database containing information detailing the transaction history of one or more consumers, such as the user of computing device 110. In the example embodiment, transaction database 142 includes a multitude of transaction entries with each transaction entry including information such as a transaction identifier, a customer identifier (such as a customer name), a merchant identifier (such as a merchant name), a transaction amount, and a transaction date. In other embodiments, each transaction entry may have some of the information listed above and/or additional information regarding the transaction.

Computing device 110 includes ad blocker 112, agent 114, and user preferences 116. In the example embodiment, computing device 110 is a computing device capable of receiving and sending data to and from other computing devices, such as server 140, via a network, such as network 130. For example, a computing device 110 may be a desktop computer, a laptop computer, a tablet computer, a handheld device, a smart-phone, a thin client, or any other electronic device or computing system capable of receiving and sending data to and from other computing devices. Computing device 110 is described in more detail with reference to FIG. 5.

Agent 114 is a program that enables users to view, watch, or listen to documents and other resources, such as audio and video files, retrieved from a network device. In an exemplary embodiment, agent 114 requests documents and other resources, identified by their URL, from server 120 via network 130. Agent 114 transmits requests to server 120 for documents and/or resources contained in application 122. Server 120 responds to the requests by retrieving the documents and resources from application 122, and transmitting them back to agent 114 via network 130. In an exemplary embodiment, documents and resources retrieved by agent 114 are viewed by a user of computing device 110 on a display device. In general, agent 114 can be any application or browser capable of execution on a computing device, and capable of supporting ad blocker 112.

User preferences 116 include information detailing one or more preferences of user of computing device 110. In the example embodiment, user preferences 116 includes one or more financial goals, one or more favorite merchants, financial and credit information, one or more shopping preferences, and one or more specific ad blocking preferences. In the example embodiment, the user preferences are input by the user of computing device 110 via a user interface, however, in other embodiments, a portion or all of the preferences may be retrieved by ad blocker 112. For example, ad blocker 112 may retrieve financial and credit information associated with the user of computing device 110 from a financial or credit institution via network 130.

In the example embodiment, ad blocker 112 is partially or fully integrated with agent 114 allowing ad blocker 112 to detect and monitor communication between agent 114 and other applications and computing devices. In other embodiments, ad blocker 112 may be a stand-alone program. In addition, ad blocker 112 is capable of determining a rating associated with the user of computing device 110 and block ads based on the determined rating. Ad blocker 112 is described in further detail below with reference to FIG. 2.

Figure 2:
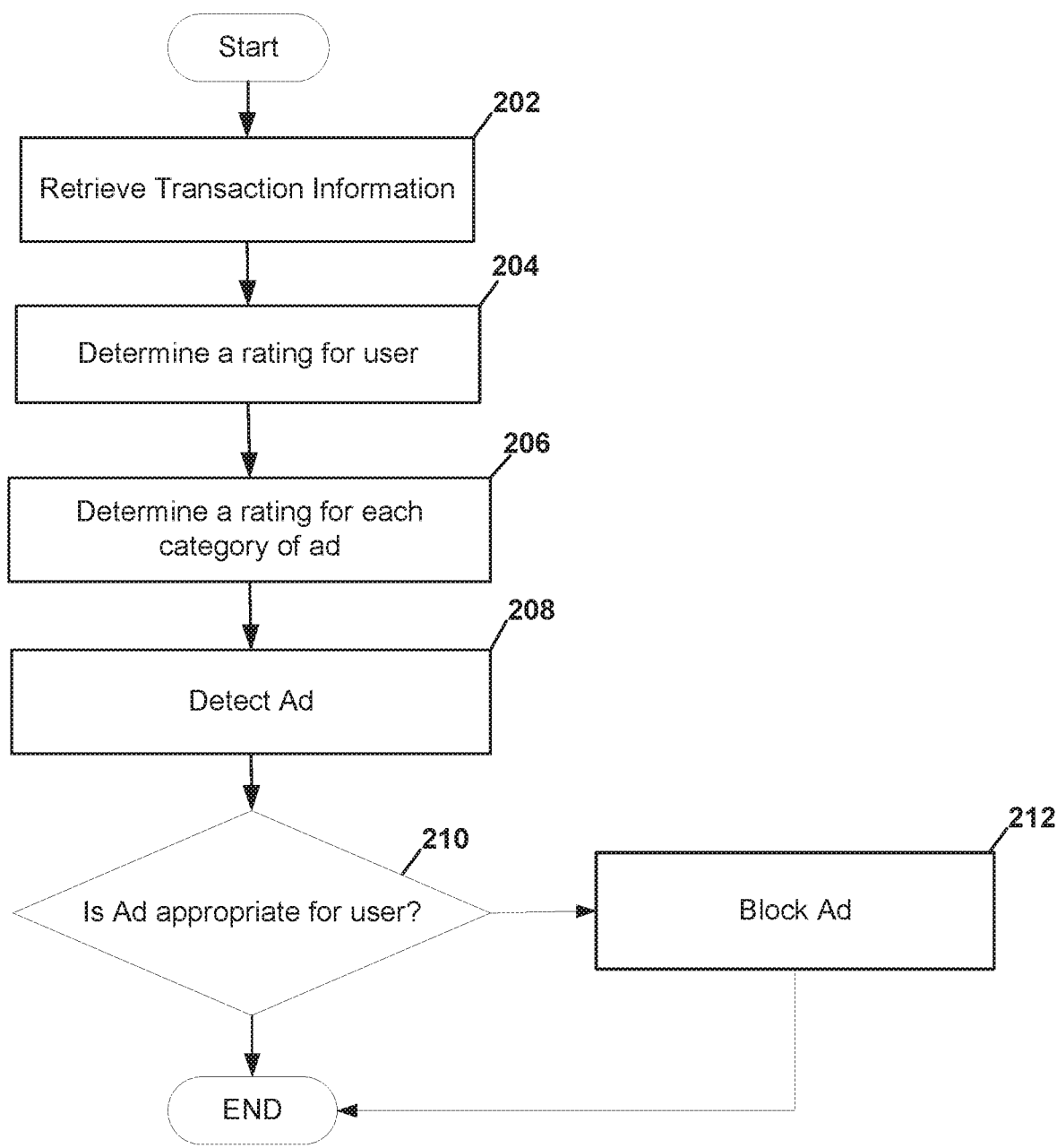
FIG. 2 is a flowchart illustrating the operations of the enhanced ad blocker program of FIG. 1, in accordance with an embodiment.

FIG. 2 is a flowchart illustrating the operations of ad blocker 112 in determining a rating associated with the user and blocking ads based on the determined rating, in accordance with an embodiment. In the example embodiment, ad blocker 112 retrieves information detailing the transaction history associated with the user of computing device 110 from transaction database 142 via network 130 (step 202). In the example embodiment, ad blocker 112 utilizes either the name and/or a customer identifier associated with the user of computing device 110 to retrieve transaction information (transaction history). As stated above, the transaction history of a user includes a transaction identifier, a customer identifier, a merchant identifier, a transaction amount, and a transaction date. Furthermore, as stated above, ad blocker 112 may receive one or more user preferences, such as user preferences 116, via user input.

In the example embodiment, ad blocker 112 determines a financial health rating associated with the user based on user preferences 116 (step 204). In the example embodiment, ad blocker 112 utilizes financial and credit information, along with the financial goals contained within user preferences 116 in order to determine a financial health rating for the user of computing device 110. Furthermore, ad blocker 112 assigns weights to each factor in order to calculate a financial health rating, such as a rating between 1 and 5 (with 1 being the worst rating and 5 being the best). Therefore, a factor detailing monthly net income minus monthly expenditures may be assigned a higher weight than a factor detailing the net worth of the user of computing device 110. For example, if the user of computing device 110 has a credit score of 650 (medium weight), a net worth of $10,000 (medium weight), a net income of $3000 per month, and monthly expenditures totaling $2900, ad blocker 112 may assign a low financial health rating to the user based on the factor detailing monthly net income minus monthly net expenditures being only $100. Furthermore, factors detailing one or more financial goals of the user of computing device 110 may be taken into account when determining a financial health rating. For example, if user preferences 116 further indicate a financial goal of saving $5000 over the next year, ad blocker 112 may assign an even lower financial health rating to account for the fact that the amount of liquidity that the user of computing device 110 may have will be affected by his or her savings goals.

In the example embodiment, ad blocker may utilize information such as liquidity, net worth, value of assets, debt, savings and investment goals, specific expenditure restrictions (desire to only spend a certain amount on clothing), credit scores, net income, monthly expenditures, general financial goals, and additional factors when calculating the rating associated with the user of computing device 110. In addition, in other embodiments, a different rating scale, such as a rating scale between 1 and 10, may be used to calculate the user rating.

Ad blocker 112 determines a rating for each category of ad (category rating) based on user preferences 116 (step 206). In the example embodiment, ad blocker 112 receives user input from the user of computing device 110 detailing a rating for category of ad. Additionally, in the example embodiment, the rating scale for a category is between 1 and 5 with 5 being the worst rated and 1 being the best rated (unlike the rating scale of the user). For example, the user of computing device 110 may input a rating of "4" for ads associated with clothing retailers, and "3" for financial services ads. Additionally, the user of computing device 110 may input a rating for ads associated with specific retailers or companies. Furthermore, in other embodiments, a different rating scale may be used.

In other embodiments, ad blocker 112 may reference information detailing the transaction history of the user retrieved from transaction database 142. Ad blocker 112 may categorize the transactions based on the merchant identifier contained in each transaction entry. In this embodiment, the merchant identifier includes information detailing a category associated with the merchant such as "restaurant", or "clothing retailer". Additionally, ad blocker 112 determines a percentage of the total transactional amount (monetary) over a certain period of time corresponding to each category. For example, over a period of a month, if the transactional amount corresponding to clothing is $100, while the total transactional amount is $1000, ad blocker 112 determines that the corresponding percentage for the category "clothing" is 10%. Ad blocker 112 compares the determined percentage to a desired percentage corresponding to each category contained within the financial goals input by the user of computing device 110. For example, the desired percentage for "grocery stores" may be higher than "clothing".

If the determined percentage is below the desired percentage, the category may be assigned a high rating (for example a rating of 1). If the determined percentage is higher than the desired percentage, the category may be assigned a low rating (for example a rating of 4). In this embodiment, ad blocker 112 determines the rating based on how much lower or how much higher the determined percentage is when compared to the desired percentage. For example, if the desired percentage for "grocery stores" is 30% while the determined percentage is 40%, and the desired percentage for "clothing is 10% and the determined percentage is 25%, ad blocker 112 may assign the category of "clothing" a higher rating than the category of "grocery stores" due to the determined percentage being 250% more than the desired percentage.

In further embodiments, ad blocker 112 may determine a rating corresponding to a specific merchant or retailer in a similar manner as described above.

Ad blocker 112 detects content corresponding to an ad (step 208). In the example embodiment, ad blocker 112 detects an ad by deciphering through the elements within a webpage being loaded by agent 114. Ad blocker 112 then detects an ad by, for example, searching for certain HTML elements, such as any element with class="Ad". Ad blocker 112 then utilizes string matching techniques to search for keywords in the portion of HTML corresponding to the ad in order to identify the category or, in some cases, the specific merchant or company. Ad blocker 112 may additionally utilize string matching techniques to search through the metadata associated with the ad in order to determine the corresponding category or merchant. For example, ad blocker 312 may search the metadata (or HTML) for terms, phrases, and/or companies/merchants associated with the category in order to determine a category, or search for specific company/merchant names and company terminology/trademarks to determine a specific merchant or company. In another embodiment, ad blocker 112 may detect an ad by monitoring server requests made by agent 114. In this embodiment, ad blocker 112 may maintain a list of ad servers and the categories and/or merchants they correspond to. When a request from agent 114 to a server is detected, ad blocker 112 cross-references the server with the list of ad servers to determine if the request involves obtaining ad information from an ad server.

Ad blocker 112 determines whether the detected ad is appropriate for the user (decision 210). In the example embodiment, ad blocker 112 determines whether the detected ad is appropriate for the user by comparing the rating associated with the category or merchant of the ad with the rating of the user. In the example embodiment, if the category rating is numerically higher than the user rating, the ad is blocked. If the category rating is numerically lower than or equal to the user rating, the ad is allowed. For example, if the detected ad is associated with the category of "clothing" which has been assigned a category rating of 4 and the user is assigned a rating of 5, ad blocker 112 allows the ad. In other embodiments, a different comparison may be performed. For example, in other embodiments, if the category rating is numerically equal to or lower than the user rating, the ad is blocked.

If ad blocker 112 determines that the ad is not appropriate for the user of computing device 110 (decision 210, "NO" branch), ad blocker 112 blocks the ad (step 212). In the example embodiment, ad blocker 112 blocks (or disallows) the ad by utilizing element hiding or communication blocking techniques (blocks communication with the ad server). Alternatively, ad blocker 112 may replace the ad with another ad, for example, an ad that is appropriate for the user of computing device 110 based on the rating system mentioned above. If ad blocker 112 determines that the ad is appropriate for the user (decision 210, "YES" branch), ad blocker 112 allows the ad and continues searching for the next ad.

In the example embodiment, in conjunction with the rating system detailed above, the user of computing device 110 may input certain retailers, companies, or categories that he or she desires to block regardless of the assigned rating. Furthermore, if ad blocker 112 allows an ad to be loaded and displayed, and the user of computing device 110 selects or clicks on the ad, ad blocker 112 prompts the user with a message stating that the user may be engaging in activities that do not align with the financial interests or preferences of the user.

In addition, while in the example embodiment, ad blocker 112 is shown as being partially integrated with agent 114, in other embodiments, ad blocker 112 may be integrated with an application present on computing device 110 (or another computing device) and function to block ads that may appear within the user interface of the application. This process may be performed in a similar way as described in the discussion of FIG. 2.

In further embodiments, ad blocker 112 may block all contents corresponding to a website rather than only blocking the ad, in the same manner as described above.

Figure 3:
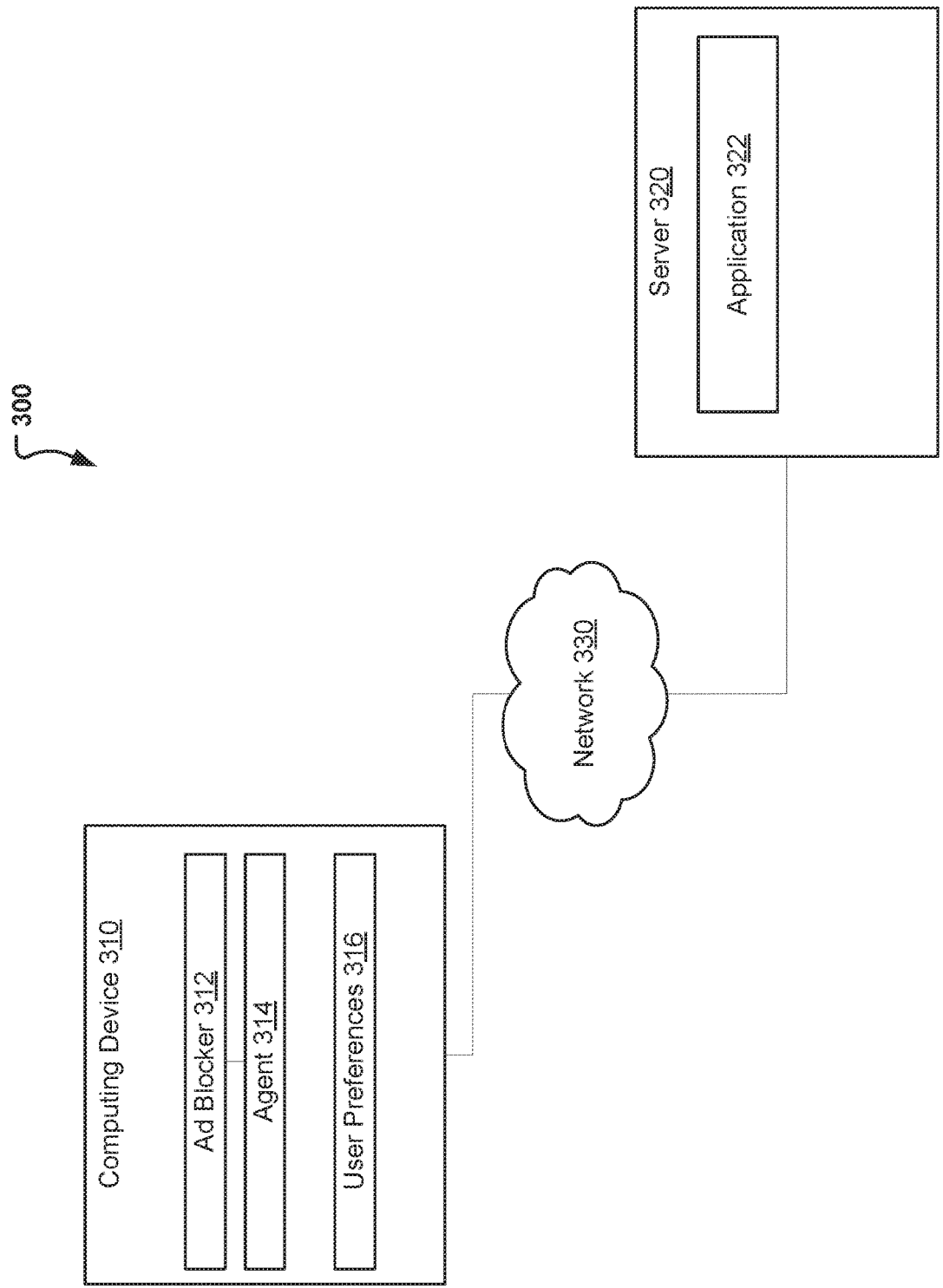
FIG. 3 illustrates an additional embodiment of the ad blocking system, in accordance with an embodiment.

FIG. 3 illustrates ad blocking system 300, in accordance with an additional embodiment. In an example embodiment, ad blocking system 300 includes computing device 310, server 320, interconnected via network 330.

In the example embodiment, network 330 is the Internet, representing a worldwide collection of networks and gateways to support communications between devices connected to the Internet. Network 330 may include, for example, wired, wireless or fiber optic connections. In other embodiments, network 330 may be implemented as an intranet, a local area network (LAN), or a wide area network (WAN). In general, network 330 can be any combination of connections and protocols that will support communications between computing device 310, server 320.

Server 320 includes application 322. Server 320 may be a desktop computer, a laptop computer, a tablet computer, a handheld device, a smart-phone, a thin client, or any other electronic device or computing system capable of receiving and sending data to and from other computing devices, such as computing device 310, via network 330. Although not shown, optionally, server 320 can comprise a cluster of servers executing the same software to collectively process requests as distributed by a front end server and a load balancer. Server 320 is described in more detail with reference to FIG. 5.

Application 322 is a collection of files including, for example, hypertext markup language (HTML) files, Cascading Style Sheets (CSS) files, image files and JavaScript files. Application 322 may also include other resources such as audio files and video files.

Computing device 310 includes ad blocker 312, agent 314, and user preferences 316. In the example embodiment, computing device 310 is a computing device capable of receiving and sending data to and from other computing devices, such as server 320, via a network, such as network 330. For example, a computing device 310 may be a desktop computer, a laptop computer, a tablet computer, a handheld device, a smart-phone, a thin client, or any other electronic device or computing system capable of receiving and sending data to and from other computing devices. Computing device 310 is described in more detail with reference to FIG. 5.

Agent 314 is a program that enables users to view, watch, or listen to documents and other resources, such as audio and video files, retrieved from a network device. In an exemplary embodiment, agent 314 requests documents and other resources, identified by their URL, from server 320 via network 330. Agent 314 transmits requests to server 320 for documents and/or resources contained in application 322.

Server 320 responds to the requests by retrieving the documents and resources from application 322, and transmitting them back to agent 314 via network 330. In an exemplary embodiment, documents and resources retrieved by agent 314 are viewed by a user of computing device 310 on a display device. In general, agent 314 can be any browser application capable of execution on a computing device, and capable of supporting ad blocker 312.

User preferences 316 include information detailing one or more preferences of user of computing device 310. In the example embodiment, user preferences 316 includes one or more financial goals, one or more favorite merchants, financial and credit information, one or more shopping preferences, and one or more specific ad blocking preferences. In the example embodiment, the user preferences are input by the user of computing device 310 via a user interface, however, in other embodiments, a portion or all of the preferences may be retrieved by ad blocker 312. For example, ad blocker 312 may retrieve financial and credit information associated with the user of computing device 310 from a financial or credit institution via network 330.

In the example embodiment ad blocker 312 is partially or fully integrated with agent 314 allowing ad blocker 312 to detect and monitor communication between agent 314 and other applications and computing devices. In other embodiments, ad blocker 312 is a stand-alone program. In addition, ad blocker 312 is capable of determining whether to block an ad based on referencing user preferences 116. Ad blocker 312 is described in further detail below with reference to FIG. 4.

Figure 4:
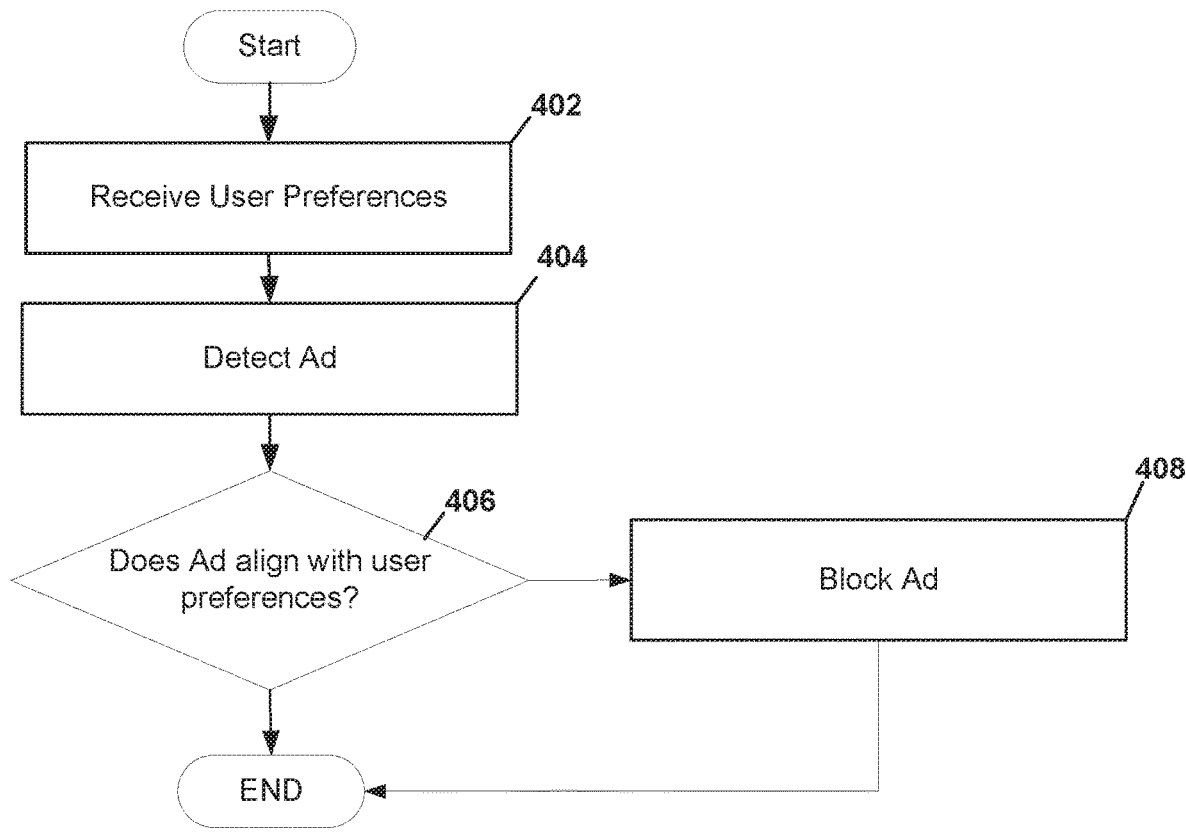
FIG. 4 is a flowchart illustrating the operations of the enhanced ad blocker program of FIG. 3, in accordance with an embodiment.

FIG. 4 is a flowchart illustrating the operations of ad blocker 312 in determining whether to block an ad based on referencing user preferences, in accordance with an embodiment. In the example embodiment, ad blocker 312 receives user preferences 316 (step 402). In the example embodiment, user preferences 316 includes information detailing specific types of ads (for example, categories of ads) that the user of computing device 310 would like to block, one or more financial goals, and financial and personal information associated with the user of computing device 310. For example, user preferences 316 may detail that the user of computing device 310 would like to block ads related to "payday loans", and "high end clothing retailers" via user input or selection. In this example, ad blocker 312 may reference a database that correlates specific keywords or phrases (such as "high end clothing retailers") to specific companies or retailers/merchants, in order to determine specific companies and retailers that should have their ads blocked. Furthermore, user preferences 316 may include information detailing a prioritization of specific companies or retailers. For example, if the user of computing device 110 provides user input that indicates that ads related to companies associated with "payday loans" should be prioritized higher than ads related to companies associated with "high end clothing retailers", then ad blocker 312 will block an ad related to "payday loans" prior to blocking an ad related to "high end clothing retailers".

Ad blocker 312 detects content corresponding to an ad (step 404). In the example embodiment, ad blocker 312 detects an ad by deciphering through the elements within a webpage being loaded by agent 314. Ad blocker 312 then detects an ad by, for example, searching for certain HTML elements, such as any element with class="Ad". Ad blocker 312 then utilizes string matching techniques to search for keywords in the portion of HTML corresponding to the ad in order to identify the category or, in some cases, the specific merchant or company. Ad blocker 312 may additionally utilize string matching techniques to search for keywords in the metadata associated with the ad in order to determine the corresponding category or merchant. For example, ad blocker 312 may search the metadata (or HTML) for terms, phrases, and/or companies/merchants associated with a category in order to determine the category, or search for specific company/merchant names and associated company terminology/trademarks to determine a specific merchant or company. In another embodiment, ad blocker 312 may detect an ad by monitoring server requests made by agent 314. In this embodiment, ad blocker 312 may maintain a list of ad servers and the categories and/or merchants they correspond to. When a request from agent 314 to a server is detected, ad blocker 112 cross-references the server with the list of ad servers to determine if the request involves obtaining ad information from an ad server.

Ad blocker 312 determines whether the detected ad aligns with user preferences 316 (decision 406). In the example embodiment, ad blocker 112 determines whether the detected ad aligns with user preferences 316 by cross-referencing the company or merchant associated with the ad with user preferences 316. For example, if user preferences 316 indicate that all ads associated with "high end clothing retailers" should be blocked, ad blocker 312 identifies the merchant or company associated with a detected ad and determines if the merchant or company qualifies as a "high end retailer" by referencing a database as described above. If ad blocker 312 determines that the merchant or company is a "high end retailer", ad blocker 312 blocks the ad. In another example, if user preferences 316 indicates all ads associated with "Company A" should be blocked, ad blocker 312 determines if the detected ad is associated with "Company A". If ad blocker 312 determines that the detected ad is associated with "Company A", ad blocker 312 blocks the ad.

Additionally, user preferences 316 may also indicate that an ad should be blocked if certain financial goals are not met. For example, user preferences 316 may indicate that ads associated with "payday loans" should be blocked if the user of computing device 310 is not adequately employed (i.e. unemployed or underemployed). In this situation, ad blocker 312 may reference professional networking websites and/or periodically query the user of computing device 110 in order to determine his or her employment status. If ad blocker 312 determines that the financial goal of being adequately employed is not met, then ad blocker 312 will block any ads associated with "payday loans" and "payday loans" companies. In the example embodiment, ad blocker 312 determines whether an ad is associated with "payday loans" in a similar manner as described above.

If ad blocker 312 determines that the detected ad does not align with user preferences 316 (decision 406, "NO" branch), ad blocker 312 blocks the ad (step 408). In the example embodiment, ad blocker 312 blocks the ad by utilizing element hiding or communication blocking techniques (blocks communication with the ad server). If ad blocker 312 determines that the detected ad does align with user preferences 316 (decision 406, "YES" branch), ad blocker 312 allows the ad and continues searching for the next ad.

Furthermore, in this embodiment, if ad blocker 312 allows an ad to be loaded and displayed, and the user of computing device 310 selects or clicks on the ad, ad blocker 312 prompts the user with a message stating that the user may be engaging in activities that do not align with the financial interests or preferences of the user.

While, in the example embodiment, ad blocker 312 is shown as being partially integrated with agent 314, in other embodiments, ad blocker 312 may be integrated with an application present on computing device 310 (or another computing device) and function to block ads that may appear within the user interface of the application. This process may be performed in a similar way as described in the discussion of FIG. 4.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
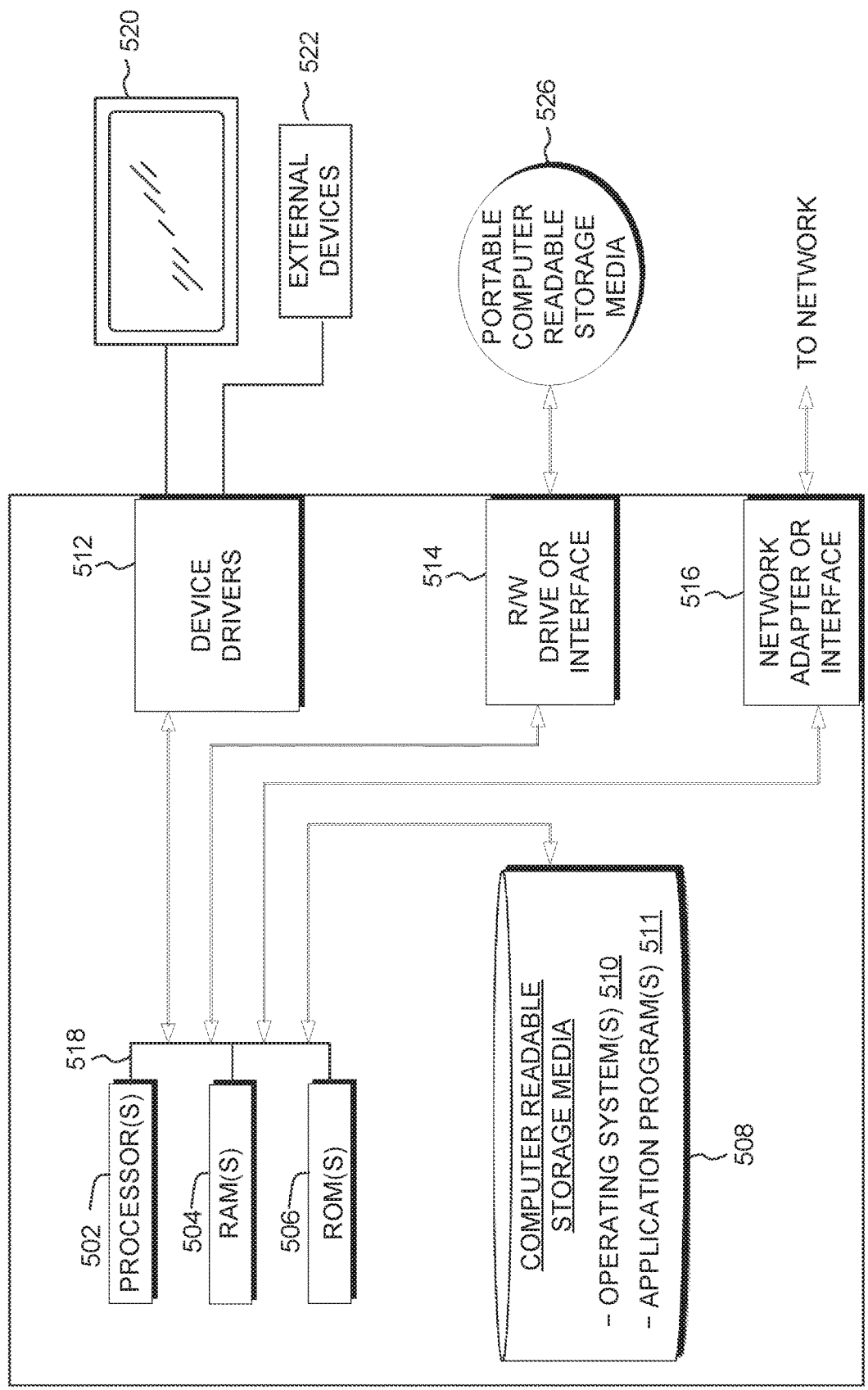
FIG. 5 is a block diagram depicting the hardware components of the ad blocking system of FIG. 1 and FIG. 3, in accordance with an embodiment.

FIG. 5 depicts a block diagram of components of computing devices contained in ad blocking system 100 of FIG. 1 and ad blocking system 300 of FIG. 3, in accordance with an embodiment. It should be appreciated that FIG. 5 provides only an illustration of one implementation and does not imply any limitations with regard to the environments in which different embodiments may be implemented. Many modifications to the depicted environment may be made.

The computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, ad blocker 112, are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

The computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

The computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
one or more processors, one or more computer-readable memories, one or more computer-readable tangible storage devices with program instructions stored on the one or more computer-readable tangible storage devices, the one or more processors configured to execute the program instructions via at least one of the one or more memories to cause the system to perform operations comprising:
determining whether a user is employed based on at least one of periodically referencing a professional networking website or periodically querying the user;
determining a financial goal of the user based on the determination of whether the user is employed:
retrieving a financial health rating for the user;
detecting a receipt of digital content that includes an advertisement;
searching metadata associated with the advertisement;
identifying, based on the searching, a merchant corresponding to the advertisement included in the digital content;
determining that the advertisement conflicts with the financial goal of the user;
responsive to the detecting the receipt of digital content and the determining that the advertisement conflicts with the financial goal of the user, comparing a rating associated with content of the advertisement and the identified merchant to the financial health rating and the determination of whether the user is employed;
determining, based on the comparing, whether the advertisement is appropriate for the user; and
responsive to determining that the advertisement is not appropriate for the user, disallowing a display of the digital content by hiding an element of a webpage containing the digital content.

2. The system of claim 1, wherein the disallowing the display of the digital content further comprises replacing a portion of the digital content corresponding to the advertisement with another portion of digital content corresponding with another advertisement.

3. The system of claim 1, wherein the operations further comprise:

identifying a category corresponding to the advertisement included in the digital content;
identifying one or more transactions of the user that correspond to the category;
determining a transactional amount for the category based on the one or more identified transactions;
determining a transactional percentage for the category by comparing the transactional amount for the category to a total transactional amount associated with the user;
comparing the determined transactional percentage for the category to a desired transactional percentage for the category input by the user; and
determining a rating for the digital content based on the comparing the determined transactional percentage.

4. The system of claim 1, wherein the operations further comprise:
identifying one or more transactions of the user that correspond to the merchant;
determining a transactional amount associated with the merchant based on the one or more identified transactions;
determining a transactional percentage associated with the merchant by comparing the transactional amount associated with the merchant to a total transactional amount associated with the user;
comparing the determined transactional percentage associated with the merchant to a desired transactional percentage for the merchant input by the user; and
determining a rating for the digital content based on the comparing the determined transactional percentage.

5. The system of claim 1, wherein the disallowing display of the digital content further comprises hiding a portion of the digital content.

6. The system of claim 1, wherein the operations further comprise:
in response to disallowing the display of the digital content, displaying second digital content that includes a second advertisement;
receiving an indication that the advertisement is selected; and
in response to receiving the indication, prompting the user with a message stating the user may be engaging in activity that does not align with financial interests of the user.

7. The system of claim 1, wherein the operations further comprise:
detecting the receipt of digital content that includes the advertisement comprises searching for an HTML element comprising a class value equivalent to "Ad," and
wherein identifying the merchant corresponding to the advertisement comprises searching metadata associated with the advertisement using string matching.

8. A computer program product, comprising:
one or more computer-readable non-transitory storage devices, and program instructions stored on at least one of the one or more storage devices, the program instructions when executed cause a machine to perform operations comprising:
determining whether a user is employed based on at least one of periodically referencing a professional networking website or periodically querying the user;
determining a financial goal of the user based on the determination of whether the user is employed:
retrieving a financial health rating for the user;
detecting a receipt of digital content that includes an advertisement;
searching metadata associated with the advertisement;
identifying, based on the searching, a merchant corresponding to the advertisement included in the digital content;
determining that the advertisement conflicts with the financial goal of the user;
responsive to the detecting the receipt of digital content and the determining that the advertisement conflicts with the financial goal of the user, comparing a rating associated with content of the advertisement and the identified merchant to the financial health rating and the determination of whether the user is employed;
determining, based on the comparing, whether the advertisement is appropriate for the user; and
responsive to determining that the advertisement is not appropriate for the user, disallowing a display of the digital content by hiding an element of a webpage containing the digital content.

9. The computer program product of claim 8, wherein the disallowing the display of the digital content further comprises replacing a portion of the digital content corresponding to the advertisement with another portion of digital content corresponding with another advertisement.

10. The computer program product of claim 9, wherein prior to the retrieving the financial health rating, the operations further comprise:
determining a plurality of financial factors comprising at least one of a credit score, a net worth, a monthly income, monthly expenditures, a numerical value equaling the monthly income minus monthly expenditures, an amount of liquidity, debt, a monetary savings goal, or a monetary investment goal; and
wherein the financial health rating is retrieved based on the plurality of financial factors.

11. The computer program product of claim 8, wherein the operations further comprise:
identifying a category corresponding to the advertisement included in the digital content;
identifying one or more transactions of the user that correspond to the category;
determining a transactional amount for the category based on the one or more identified transactions;
determining a transactional percentage for the category by comparing the transactional amount for the category to a total transactional amount associated with the user;
comparing the determined transactional percentage for the category to a desired transactional percentage for the category input by the user; and
determining a rating for the digital content based on the comparing the determined transactional percentage.

12. The computer program product of claim 8, wherein the operations further comprise:
identifying one or more transactions of the user that correspond to the merchant;
determining a transactional amount associated with the merchant based on the one or more identified transactions;
determining a transactional percentage associated with the merchant by comparing the transactional amount associated with the merchant to a total transactional amount associated with the user;
comparing the determined transactional percentage associated with the merchant to a desired transactional percentage for the merchant input by the user; and
determining a rating for the digital content based on the comparing the determined transactional percentage.

13. The computer program product of claim 8, wherein the disallowing the display of the digital content further comprises hiding a portion of the digital content.

14. The computer program product of claim 8, wherein the operations further comprise:
   in response to disallowing the display of the digital content, displaying second digital content that includes a second advertisement;
   receiving an indication that the advertisement is selected; and
   in response to receiving the indication, prompting the user with a message stating the user may be engaging in activity that does not align with financial interests of the user.

15. The computer program product of claim 8, wherein the operations further comprise:
   detecting the receipt of digital content that includes the advertisement comprises searching for an HTML element comprising a class value equivalent to "Ad," and
   wherein identifying the merchant corresponding to the advertisement comprises searching metadata associated with the advertisement using string matching.

16. A method, comprising,
   determining whether a user is employed based on at least one of periodically referencing a professional networking website or periodically querying the user;
   determining a financial goal of the user based on the determination of whether the user is employed:
   retrieving a financial health rating for the user based on financial information associated with the user;
   detecting a receipt of digital content that includes an advertisement;
   identifying a merchant corresponding to the advertisement included in the digital content by searching metadata associated with the advertisement;
   determining that the advertisement conflicts with the financial goal of the user;
   responsive to the detecting the receipt of digital content and the determining that the advertisement conflicts with the financial goal of the user, comparing a rating associated with a content of the advertisement and the identified merchant to the financial health rating and the determination of whether the user is employed to determine the advertisement is not appropriate for the user; and
   responsive to determining that the advertisement is not appropriate for the user, disallowing a display of the digital content by hiding an element of a webpage containing the digital content.

17. The method of claim 16, wherein:
   detecting the receipt of digital content that includes the advertisement comprises searching for an HTML element comprising a class value equivalent to "Ad," and
   wherein identifying the merchant corresponding to the advertisement comprises searching metadata associated with the advertisement using string matching.

18. The method of claim 16, further comprising:
   in response to disallowing the display of the digital content, displaying second digital content that includes a second advertisement;
   receiving an indication that the advertisement is selected; and
   in response to receiving the indication, prompting the user with a message stating the user may be engaging in activity that does not align with financial interests of the user.

19. The method of claim 16, wherein the rating for the digital content is determined by:
   identifying a category corresponding to the advertisement included in the digital content;
   identifying one or more transactions of the user that correspond to the category;
   determining a transactional amount for the category based on the one or more identified transactions;
   determining a transactional percentage for the category by comparing the transactional amount for the category to a total transactional amount associated with the user; and
   comparing the determined transactional percentage for the category to a desired transactional percentage for the category input by the user, wherein the rating is based on the comparing the determined transaction percentage.

20. The method of claim 16, wherein the rating for the digital content is determined by:
   identifying one or more transactions of the user that correspond to the merchant;
   determining a transactional amount associated with the merchant based on the one or more identified transactions;
   determining a transactional percentage associated with the merchant by comparing the transactional amount associated with the merchant to a total transactional amount associated with the user; and
   comparing the determined transactional percentage associated with the merchant to a desired transactional percentage for the merchant input by the user, wherein the rating is based on the comparing the determined transaction percentage.

* * * * *